Patented June 9, 1936

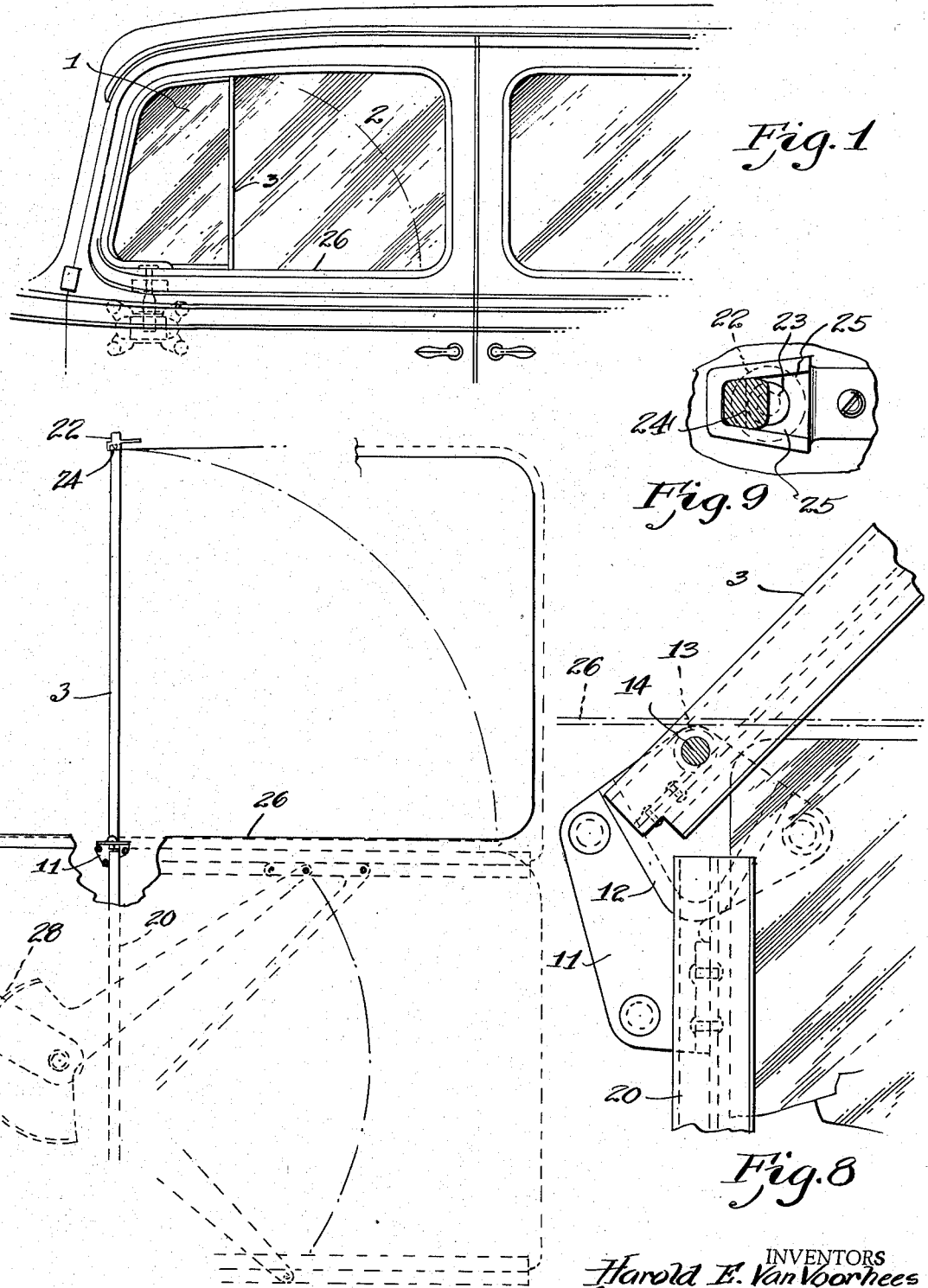

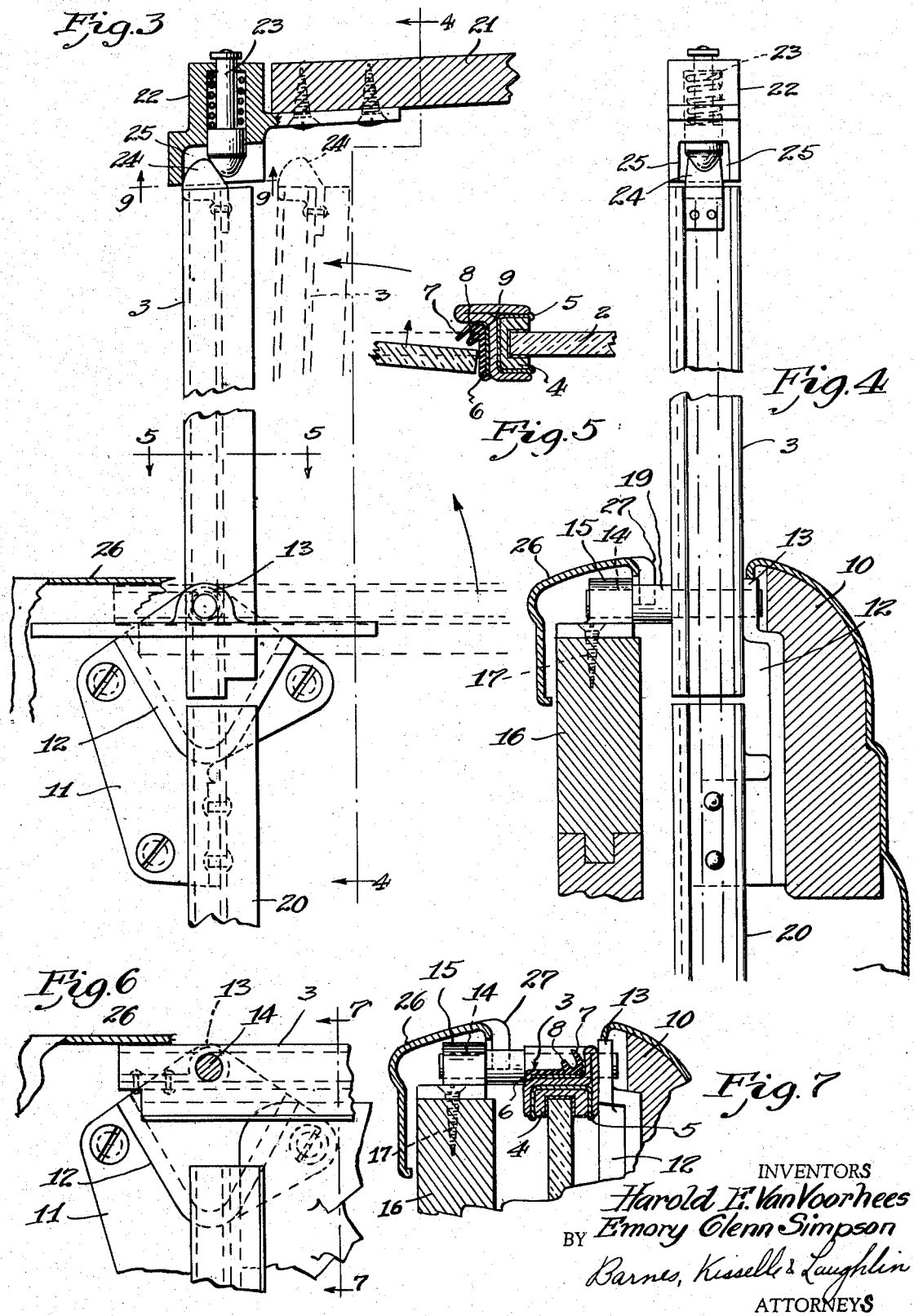

2,043,311

UNITED STATES PATENT OFFICE 2,043,311

VENTILATING WINDOW FOR AUTOMOBILES

Harold E. Van Voorhees, Windsor, Ontario, Canada, and Emory Glenn Simpson, Detroit, Mich., assignors to Ternstedt Manufacturing Company, Detroit, Mich., a corporation of Michigan Application June 14, 1933, Serial No. 675,732

6 Claims. (Cl. 296—44)

This invention relates to windows for automobiles and other vehicles. It is the object of the invention to provide a window in which individually controlled ventilation can be built in the window itself. Such a window is not broadly new but this invention relates to an improvement in this type of window in which there is employed a foldable pillar between the swinging panel and the movable panel to the rear of the swinging panel. One of the points of novelty in this pillar is that it may be raised either by hand or automatically by raising the window with a window regulator and snapped into non-rattling position without the manipulation of any bolting or latching device.

Referring to the drawings:

Fig. 1 is a fragmentary side elevation of an automobile equipped with the improvement.

Fig. 2 is a schematic view.

Fig. 3 is a fragmentary vertical section through parts of the body showing the pillar and the supporting bracket and the latch.

Fig. 4 is a vertical section through the same parts taken on the line 4—4 of Fig. 3.

Fig. 5 is a section on the line 5—5 of Fig. 3.

Fig. 6 is a detail of the supporting bracket and part of the post in folded position.

Fig. 7 is a cross section taken on line 7—7 of Fig. 6.

Fig. 8 is a fragmentary elevational view showing the pillar being lifted by the sliding panel.

Fig. 9 is a section on the line 9—9 of Fig. 3.

The forward panel 1 of the window is hinged to swing on an upwardly extending axis so as to provide ventilation and guard the interior of the car against undesirable drafts. This panel can be swung outwardly on its hinges to act as a wind deflector and inasmuch as the particular panel here shown is pivoted to the rear of the front edge of the panel, a portion of the front panel will swing inwardly leaving a gap between the panel and the front door post. Air will, when the car is moving, be drawn out of the gap at the rear of the swinging panel, when this is swung outwardly. This is caused by the aspirating effect of the body of air through which the car is moving and is described in previous patents and is now known in the art. If there is a gap at the front of the swinging panel as happens to be in the case here shown, air will be drawn in through the front opening and out through the rear gap. This stream of air can be controlled by raising and lowering the sliding panel 2 which thus has a valving action. In our first commercial embodiment of this type of window and this principle of ventilation, the two panels are connected by a sash strip on the sliding panel straddling the swinging window when the two panels are in the same plane. This made a very effective window as the connection between the two is automatically withdrawn when the sliding panel is lowered into the window well. However, it is open to the objection that the front swinging window could not be opened without first lowering the sliding panel. It is the object of the present invention to overcome this objection and still permit the spacing member or the guide for the sliding panel to be swung down out of the way when this is desired.

Referring to Figs. 3, 4, and 5, it will be seen that the division pillar is designated 3 and comprises an "h" channel 4 in cross section. The channel groove is provided with a window guide for the sliding window 2, preferably in the form of stiff bristles. This is carried in a window channel 5 of thin sheet metal. On the other side of the division pillar is a special form of weatherstrip designated 6 which has a bearing of fins 7 and 8, (Fig. 5). This weatherstrip of rubber can be vulcanized to the sheet metal strip 9 and this can be secured to the "h" cross section division pillar by any suitable way which it is not necessary here to show in detail.

Secured to the belt board 10 is a hinge bracket plate 11 provided with an offset V-like portion 12 which strengthens the plate and brings the upper hinge knuckle portion 13 in the desired plane for hinging the division pillar. Supported by the division pillar is a hinge pin 14 which passes through an opening in the knuckle portion 13 and through an opening in the hinge knuckle 15, the latter in the form of a plate securable to the removable upper portion 16 of the lock board by means of screws 17. It will be noticed that there is a spacing sleeve 19, (Fig. 4) between the hinge knuckle and the division pillar. This is for accurately spacing and locating the division pillar with respect to the lower glass run channel 20 and for permitting the inner hinge knuckle member to be located accurately on the upper lock board member. It is very necessary to get unusual accuracy for parts such as are here used, otherwise the pillar will not operate satisfactorily.

Secured to the upper window frame rail 21, (Fig. 3) is a latch fixture or keeper 22 adapted to contain the spring pressed plunger 23. This spring pressed plunger has a beveled head which is beveled on at least two sides so that the striker cam 24 carried on the end of the swinging division pillar is swung into its operable position. It is also beveled on the rear so that by giving the pillar a jerk or pull, the pillar may be easily released. It will be noticed that the fixture 22 has a pair of side walls (Fig. 4), 25, which form a channel that acts to guide the striker cam 24 into engagement with the latch plunger. Furthermore, as shown in Fig. 9, the walls of the channels converge and hence the latch drives the striker cam into wedging relation with the walls to eliminate all rattling.

The hinge knuckles are concealed below the top of the window opening as is clearly shown in Fig. 7 where it will be seen that the usual garnish molding 26 overlies the hinge knuckle 15 so that this member is completely concealed. The garnish molding is narrowed slightly at this point as will be seen by comparing the cross section portion with the wider portion 27. By this submersion of the hinge pin knuckles below the garnish molding and the window opening the division pillar may be folded down to a completely disappearing position as is shown plainly in Figs. 6 and 7. This creates an ideal condition for then the pillar is completely out of the way and in no way interferes with the arm of the occupant of the seat if he chooses to rest his arm on the window opening frame.

The division pillar may be raised either by hand or by the operation of the usual window regulator which is only shown schematically at 28, in Fig. 2. By turning the window regulator, the division pillar may be forced out of the window well so it can be raised by hand or if one desires to completely close the window, all that is necessary to do is to continue turning the regulator and the glass will gradualy lift the pillar as shown in Fig. 8.

In order to accomplish these several functions, satisfactorily, it is necessary that the bearings, the hinge pin and the latch, etc., all be very accurately located so that there will be no hitch in the operation. In order to get the very best results, the bearing for the hinge pin on the inside of the window is located some distance from the pillar. This distance is represented by the length of the spacer 19. The purpose of this is to lengthen the hinge pin so that if there is any looseness in or misplacement of the bearing, this will not so adversely affect the swinging pillar as would be the case if the bearing 15 were closely up against the swinging pillar. It is desirable and necessary to guard against this looseness and misplacement to get the proper cooperation of the parts for a small amount of looseness or misplacement in the bearing will result in considerable magnification at the upper end of the swinging pillar and it may result in its not properly cooperating with the latch fixture at the top of the window opening. The pin is preferably made rigid with the swinging pillar by a press fit, welding or brazing.

What we claim is:

1. In a vehicle body having a window frame, a panel supported to swing in said frame on an up and down axis, a window well below a portion of said frame, and a sliding panel, arranged to be withdrawn into the window well, and raised to close with the next mentioned element the gap in the window opening between the free edge of the swinging panel and the opposite side of the frame, the combination of a division pillar pivoted to swing down out of operative position when the sliding panel is withdrawn into the window well and an automatically locking and releasing latch mechanism including a fitting for securing the window frame and provided with a spring pressed plunger having a plurality of beveled faces and a stop portion spaced from the plunger and a double beveled faced striker secured on the end of the division pillar so that by swinging the division pillar upwardly it may automatically displace the latch plunger and by exerting sufficient pull on the pillar, it may automatically release and when the pillar is raised the striker abuts against the stop and is held in this position by engagement with the spring pressed plunger.

2. In an automobile body, the combination of a window well and frame including a garnish molding, a pair of panels arranged to complement each other to form a complete window, one swinging on an upright axis and the other slidable into the window well, a swinging division pillar for forming a jamb against which the swinging panel closes and a guide for the sliding panel, and a hinge for said swinging pillar, comprising a knuckle member securable on the outer wall of the window well and a second knuckle secured under the garnish molding.

3. In an automobile body, having a window well and frame, including a garnish molding, a pair of panels, arranged to complement each other to form a complete window, one swinging on an upright axis and the other slidable into the window well below the frame, the combination of a swinging division pillar for forming a jamb against which the swinging panel closes and a guide for the sliding panel, and a hinge member for pivotally supporting said division pillar, comprising a knuckle-carrying member securable to one wall of the window well and a second knuckle member securable under the garnish molding, a pin supported to turn in said knuckles and passing through the swinging pillar, and a spacing sleeve on the pin and between the second knuckle and the swinging pillar.

4. In a vehicle body having a window frame, a panel supported to swing in said frame on an up and down axis, a window well below a portion of said frame, and a sliding panel, arranged to be withdrawn into the window well and raised to close in connection with the next mentioned element the gap in the window opening between the free edge of the swinging panel and the opposite side of the frame, the combination of a division pillar pivoted to swing down out of operative position when the sliding panel is withdrawn into the window well and a latching mechanism secured to the upper portion of the window frame and comprising a converging wall channel fitted with a latching plunger and a beveled cam-like striker secured on the top of the division pillar so that when the division pillar is swung to its upright position, it automatically displaces the latch plunger and drives the striker into wedging relation with the converging walls of the channel.

5. In an automobile body, the combination of a window frame affording a window opening and window well, a window comprising a pair of panels, one of which is slidable up and down in the window well and window opening and the other of which is swingable in the remainder of the window opening, a pivotable disappearing division pillar acting as a stop for the swinging panel and a channel to receive the edge of the sliding panel, a latch and striker set including a keeper for holding the upper end of the division pillar to the window frame when the pillar is in its upright position, the said set having some of the members secured to the top of the pillar and some to the window frame, and means for pivoting the lower end of the pillar which means includes two widely spaced pivot bearings spaced considerably more than the width of the pillar so that any looseness or displacement in the bearings will minimize the angular displacement of the pillar and minimize the displacement from accurate registration of the parts of the latch set at the top of the pillar.

6. In an automobile body, the combination of a window frame affording a window opening and window well, a window comprising a pair of panels, one of which is slidable up and down in the window well and window opening and the other of which is swingable in the remainder of the window opening, a pivotable disappearing division pillar acting as a stop for the swinging panel and a channel to receive the edge of the sliding panel, a latch and striker set including a flared keeper for holding and guiding the upper end of the division pillar to the window frame when the pillar is in its upright position, the said set having some of the members secured to the top of the pillar and some to the window frame, and means for pivoting the lower end of the pillar which means includes two widely spaced pivot bearings spaced considerably more than the width of the pillar so that any looseness or displacement in the bearings will minimize the angular displacement of the pillar and minimize the displacement from accurate registration of the parts of the latch set at the top of the pillar.

HAROLD E. VAN VOORHEES.
EMORY GLENN SIMPSON.